United States Patent
Saegusa et al.

(10) Patent No.: US 9,821,821 B2
(45) Date of Patent: Nov. 21, 2017

(54) MEASURING DEVICE

(71) Applicant: Hitachi, Ltd., Chiyoda-ku, Tokyo (JP)

(72) Inventors: Takashi Saegusa, Tokyo (JP); Toshihiro Arisaka, Tokyo (JP); Hiroki Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 14/738,041

(22) Filed: Jun. 12, 2015

(65) Prior Publication Data

US 2016/0061651 A1   Mar. 3, 2016

(30) Foreign Application Priority Data

Aug. 28, 2014   (JP) ................. 2014-173425

(51) Int. Cl.
*B61F 5/24*   (2006.01)
*G01H 1/00*   (2006.01)

(52) U.S. Cl.
CPC ............. *B61F 5/245* (2013.01); *G01H 1/00* (2013.01)

(58) Field of Classification Search
CPC .......... B61F 5/245; G01M 7/022; G01M 7/06
See application file for complete search history.

(56) References Cited

U.S. PATENT DOCUMENTS

| | | | | |
|---|---|---|---|---|
| 4,061,017 A * | 12/1977 | Sloane | ................. | G01M 7/022 703/1 |
| 5,979,242 A * | 11/1999 | Hobbs | ................. | G01M 7/06 73/663 |
| 6,763,310 B2 * | 7/2004 | Lafleur | ................. | G01M 7/00 702/33 |
| 8,301,272 B2 * | 10/2012 | Mankame | ............ | B81B 3/0059 700/19 |
| 2006/0061744 A1 | 3/2006 | Mensler et al. | | |
| 2012/0025015 A1 * | 2/2012 | Ito | .......... | B64C 13/40 244/99.6 |
| 2015/0289849 A1 * | 10/2015 | Taniguchi | ............ | A61B 8/5207 600/443 |

FOREIGN PATENT DOCUMENTS

| | | | |
|---|---|---|---|
| JP | 10-143254 | * | 5/1998 |
| JP | 10-227149 | * | 8/1998 |
| JP | 2006-118694 A | | 5/2006 |

* cited by examiner

*Primary Examiner* — Helen Kwok
(74) *Attorney, Agent, or Firm* — Crowell & Moring LLP

(57) ABSTRACT

A measuring device is applied to an active damping system, the active damping system including a damper having a plurality of sensors and a plurality of actuators, the damper being arranged on an object to be subjected to damping. The measuring device includes: a transmission characteristic storage unit configured to store a plurality of transmission characteristics calculated from driving signals and vibration state signals; a damping performance setting unit configured to set damping performance including the amount of vibration reduction required of the active damping system and a frequency of vibration; and a damper configuration calculator configured to calculate how many the number of the sensors and actuators for the damper is increased or decreased on the basis of the transmission characteristics and the damping performance, with the increase or decrease being necessary in order that the damping performance set in the damping performance setting unit is satisfied.

8 Claims, 8 Drawing Sheets

F I G . 1
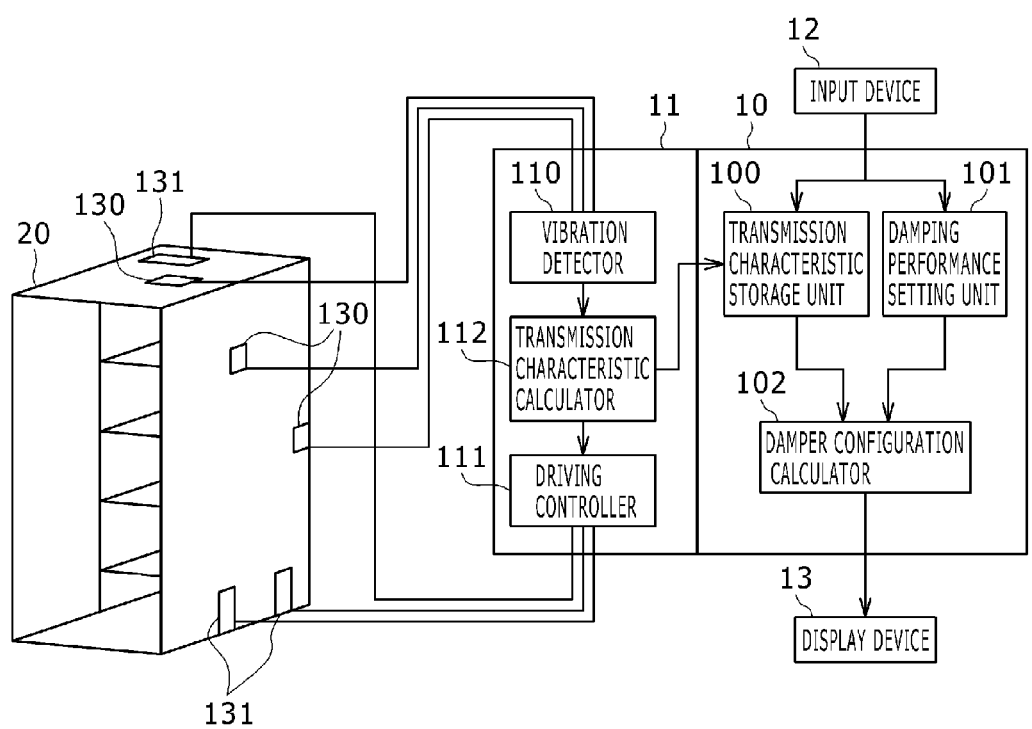

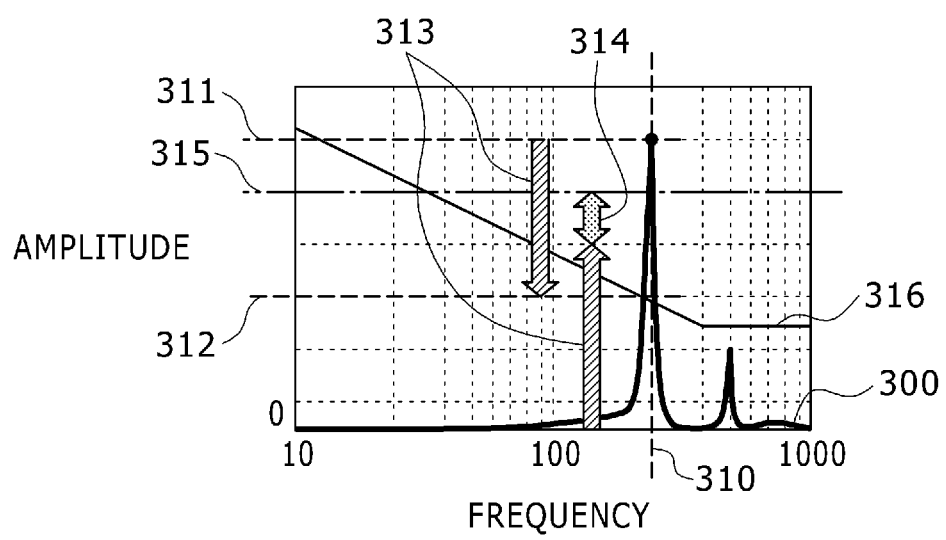

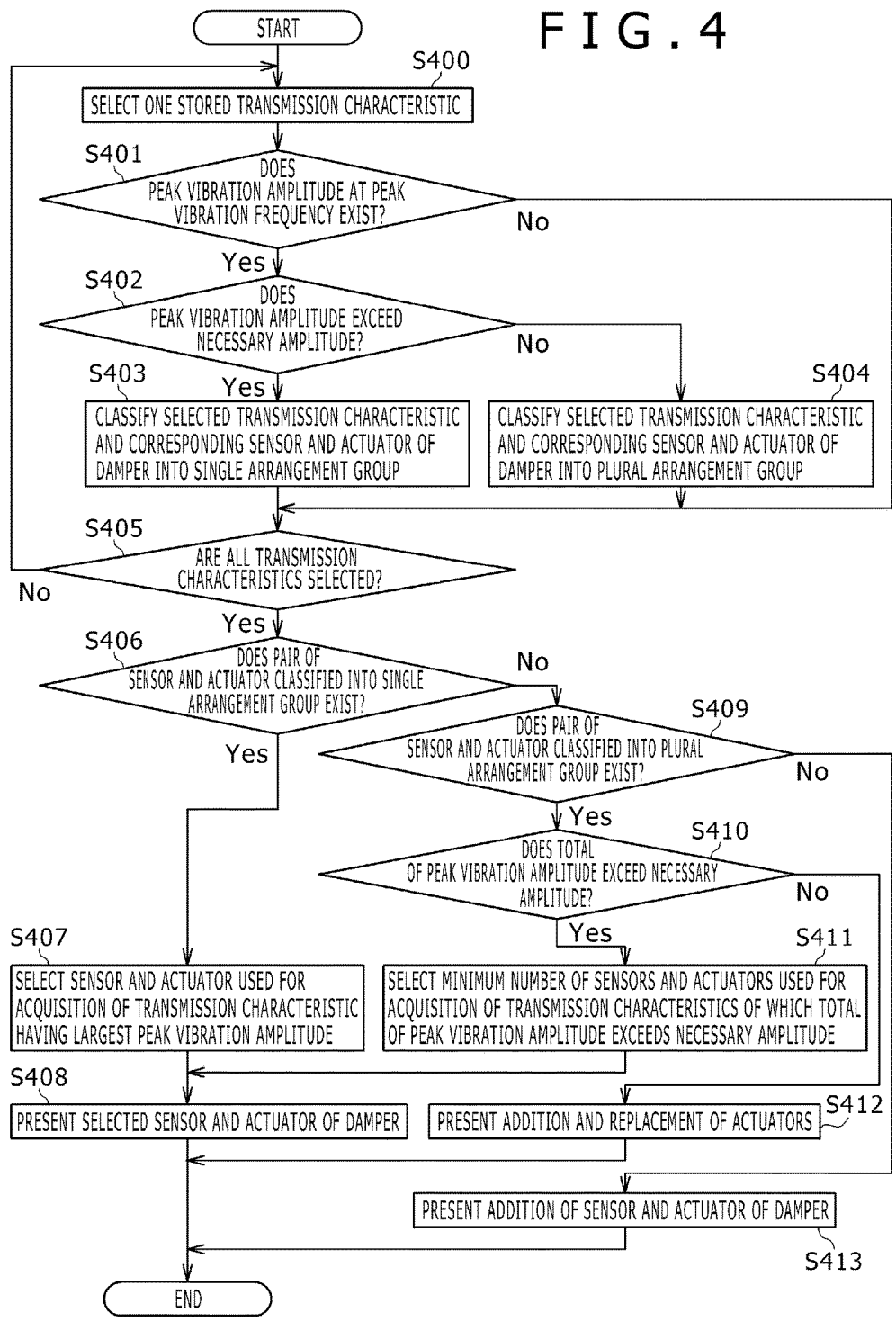

MEASURING DEVICE

BACKGROUND OF THE INVENTION

1. Field of the Invention

The present invention relates to a measuring device that is used when being applied to an active damping system.

2. Description of the Related Art

An active damping system includes a damper provided with a plurality of sensors and a plurality of actuators and has a configuration in which the damper can be freely arranged in a distributed manner on an object to be subjected to damping.

In such an active damping system, the damper can be highly freely arranged on the object to be subjected to damping, and the actuators that suppress vibration can be efficiently arranged. The arrangement and the number of sensors and actuators of the damper, however, need to be set on the basis of a mechanism characteristic of the object to be subjected to damping and performance (hereinafter referred to as damping performance) that is required for damping and is the amount of suppression of vibration, the frequency of the vibration, and the like.

A conventional technique for the setting is described in JP-2006-118694-A, for example. In the conventional technique, an active damping system includes a sensor configured to measure vibration of a vehicle body, an actuator arranged on a floor panel of the vehicle body, and a controller configured to control the actuator on the basis of a physical quantity measured by the sensor. The actuator is arranged on a member of the vehicle body whose rigidity is greater than an average rigidity of the entire floor panel, whereby the conventional active damping system reduces noise caused by the vibration of the vehicle body.

SUMMARY OF THE INVENTION

In the technique described in JP-2006-118694-A, however, the number of processes to be applied to the active damping system is not considered for a case in which a vibration mode of the object to be subjected to the damping is complex like a box casing, or a case in which the rigidity of the object to be subjected to the damping is not known. In such cases, it is difficult to quickly apply the active damping system.

It is, therefore, an object of the present invention to provide a measuring device and a setting method that experimentally vibrate a plurality of actuators arranged on an object to be subjected to damping, use vibration characteristics acquired by a plurality of sensors upon the vibration so as to automatically calculate the number of sensors and actuators necessary to be arranged on the object to be subjected to damping in order to satisfy damping performance and how many the number of the sensors and actuators is increased or decreased, and thereby reduce the number of processes to be applied to an active damping system.

In order to solve the aforementioned problem, according to the present invention, a measuring device is applied to an active damping system, the active damping system including a damper having a plurality of sensors and a plurality of actuators, the damper being arranged on an object to be subjected to damping. The measuring device includes: a transmission characteristic storage unit configured to store a plurality of transmission characteristics calculated from driving signals for driving the actuators and vibration state signals detected by the sensors upon the driving of the actuators; a damping performance setting unit configured to set damping performance including the amount of vibration reduction required of the active damping system and a frequency of vibration; and a damper configuration calculator configured to calculate how many the number of the sensors and actuators for the damper is increased or decreased on the basis of the plurality of transmission characteristics stored in the transmission characteristic storage unit and the damping performance set in the damping performance setting unit, with the increase or decrease in the number of the sensors and actuators being necessary in order that the damping performance set in the damping performance setting unit is satisfied.

In addition, the damper configuration calculator may calculate, from the plurality of sensors of the damper and the plurality of actuators of the damper, a pair of at least one sensor and at least one actuator that are at least necessary to satisfy the damping performance set in the damping performance setting unit, on the basis of the plurality of transmission characteristics stored in the transmission characteristic storage unit and the damping performance set in the damping performance setting unit.

In addition, the damping performance setting unit may have, as the set damping performance, an amplitude margin set to a value equal to or larger than differences between amplitude when the damping is actually executed using the sensors and the actuators by the active damping system and amplitude upon the acquisition of the transmission characteristics, and an amplitude limit that is an amplitude threshold for limiting amplitude of vibration other than a frequency targeted for the damping when the damping is actually executed using the sensors and the actuators by the active damping system.

In addition, the measuring device may further include a vibration detector connected to the plurality of sensors and configured to acquire the vibration state signals detected by the sensors; a controller connected to the plurality of actuators and configured to output driving command signals to the actuators and drive the actuators on the basis of input information of a method for driving the actuators; and a transmission characteristic calculator configured to calculate the transmission characteristics from the driving signals for driving the actuators and the vibration state signals detected by the sensors upon the driving of the actuators, wherein the transmission characteristic calculator causes the calculated transmission characteristics to be stored in the transmission characteristic storage unit.

In addition, the measuring device may further include an input device configured to set the damping performance required of the active damping system in the damping performance setting unit; and a display device configured to present results calculated by the damper configuration calculator.

The input device and the display device may be unified.

In addition, the measuring device may further include, as presenting means, a display controller configured to control a display unit on the basis of results calculated by the damper configuration calculator, wherein the display controller controls the display unit attached to the damper of the active damping system and thereby presents the results calculated by the damper configuration calculator.

In addition, the measuring device may further include, as presenting means, a display controller configured to control a display unit on the basis of results calculated by the damper configuration calculator, wherein the display controller controls the display unit attached to the measuring device and thereby presents the results calculated by the damper configuration calculator.

In order to solve the aforementioned problem, according to the present invention, a setting method is applied to an active damping system, the active damping system including a damper having a plurality of sensors and a plurality of actuators, the damper being arranged on an object to be subjected to damping. The setting method includes the step of calculating, on the basis of the transmission characteristics calculated from the driving signals for driving the actuators and the vibration state signals detected by the sensors upon the driving of the actuators and the damping performance including the amount of vibration reduction required of the active damping system and a frequency of vibration, how many the number of the sensors and actuators for the damper is increased or decreased, with the increase or decrease in the number of the sensors and actuators being necessary in order that the damping performance of the active damping system is satisfied.

In addition, the setting method may further include the step of calculating, from the plurality of sensors and the plurality of actuators, a pair of at least one sensor and at least one actuator that are at least necessary to satisfy the damping performance, on the basis of the plurality of transmission characteristics and the damping performance.

In addition, the damping performance may include an amplitude margin set to a value equal to or larger than the difference between amplitude when damping is actually executed using the sensors and the actuators by the active damping system and amplitude upon the acquisition of the transmission characteristics, and an amplitude limit that is an amplitude threshold for limiting amplitude of vibration other than a frequency targeted for the damping when the damping is actually executed using the sensors and the actuators by the active damping system.

In addition, the setting method according to the present invention may further include the steps of acquiring vibration state signals detected by the plurality of sensors, outputting driving command signals for driving the plurality of actuators, and calculating transmission characteristics from the driving signals for driving the actuators and the vibration state signals detected by the sensors upon the driving of the actuators.

In addition, the setting method according to the present invention may further include the steps of setting the damping performance required of the active damping system from an input device of a measuring device and causing a display device of the measuring device to present results calculated by a damper configuration calculator.

The setting method according to the present invention may further include the steps of controlling a display unit on the basis of results calculated by the damper configuration calculator and controlling the display unit attached to the damper of the active damping system so as to present the results calculated on the basis of the plurality of transmission characteristics and the damping performance.

In addition, the setting method according to the present invention may further include the steps of controlling a display unit on the basis of results calculated by the damper configuration calculator and controlling the display unit attached to the measuring device so as to present the results calculated on the basis of the plurality of transmission characteristics and the damping performance.

According to a main aspect of the present invention, an object to be subjected to damping is experimentally vibrated using a plurality of actuators arranged on the object to be subjected to the damping, and the number of sensors and actuators that are necessary for damping and how many the number of the sensors and actuators is increased or decreased can be automatically calculated using vibration characteristics acquired by the plurality of sensors. Therefore, a mechanism characteristic of the object to be subjected to the damping and a mechanism model do not need to be prepared and the number of processes to be applied by the active damping system to the object to be subjected to damping can be reduced. Thus, a problem especially with vibration in a post-process for a product can be quickly handled and a high damping effect can be achieved.

BRIEF DESCRIPTION OF THE DRAWINGS

Other objects and advantages of the invention will become apparent from the following description of embodiments with reference to the accompanying drawings in which:

FIG. 1 is a configuration diagram of a measuring device according to a first embodiment;

FIG. 3 is a Bode diagram illustrating damping performance set in the measuring device according to the first embodiment;

FIG. 4 is a flowchart of a process operation of calculating a configuration of a damper for the measuring device according to the first embodiment;

DESCRIPTION OF THE PREFERRED EMBODIMENTS

Figure 2:
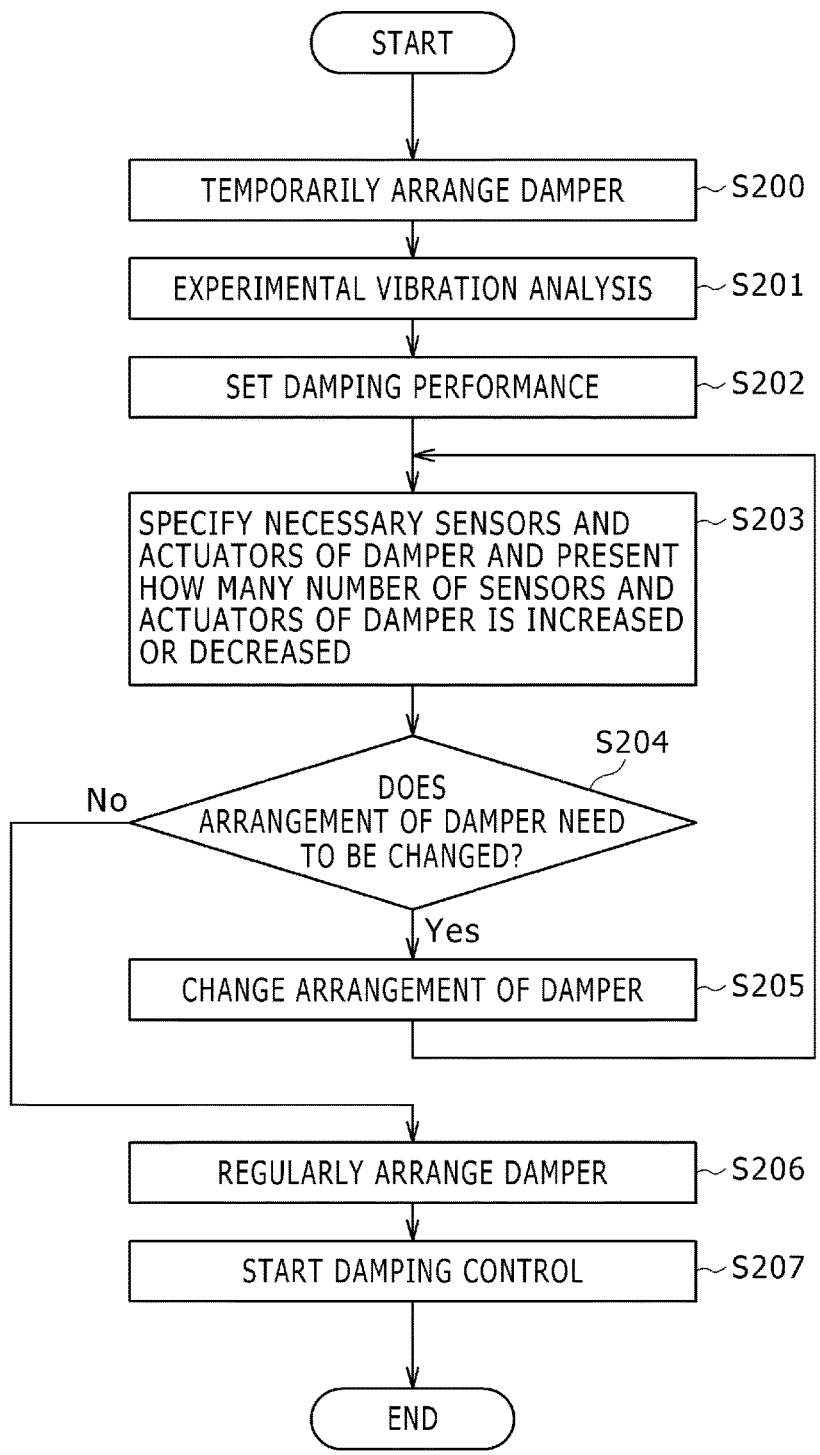
FIG. 2 is a flowchart of a method for setting an active damping system using the measuring device according to the first embodiment.

Embodiments of the present invention are described below in detail with reference to the accompanying drawings.

First Embodiment

First, a configuration of a measuring device according to a first embodiment is described.

FIG. 1 is a configuration diagram of the measuring device according to the first embodiment.

The measuring device according to the first embodiment includes a damper configuration calculating device 10, a transmission characteristic acquiring device 11, an input device 12, and a display device 13 and calculates a configuration of a damper that has a plurality of sensors 130 and a plurality of actuators 131 and is arranged on an object 20 to be subjected to damping.

The damper configuration calculating device 10 includes a transmission characteristic storage unit 100, a damping performance setting unit 101, and a damper configuration calculator 102.

The transmission characteristic acquiring device 11 includes a vibration detector 110, a driving controller 111, and a transmission characteristic calculator 112.

Next, operations of the measuring device are described.

First, operations of the damper configuration calculating device 10 are described.

The damper configuration calculating device 10 receives, from the input device 12, damping performance including the amount of vibration reduction required of an active damping system and a frequency of vibration. The damper configuration calculating device 10 outputs, to the display device 13, the number of sensors 130 and actuators 131 of the damper that are necessary to satisfy the damping performance, and information of how many the number of the sensors 130 and actuators 131 is increased or decreased.

The transmission characteristic storage unit 100 of the damper configuration calculating device 10 stores a plurality of transmission characteristics calculated from driving signals transmitted from the transmission characteristic acquiring device 11 and provided to drive the actuators 131 and vibration state signals detected by the sensors 130 upon the driving of the actuators 131.

The damping performance is set in the damping performance setting unit 101 of the damper configuration calculating device 10 by the input device 12.

The damper configuration calculator 102 of the damper configuration calculating device 10 calculates, on the basis of the plurality of transmission characteristics stored in the transmission characteristic storage unit 100 and the damping performance set in the damping performance setting unit 101, the number of sensors 130 and actuators 131 of the damper that are necessary to satisfy the damping performance, and how many the number of the sensors 130 and actuators 131 is increased or decreased, and outputs results of the calculation to the display device 13.

Next, operations of the transmission characteristic acquiring device 11 are described.

The transmission characteristic acquiring device 11 is connected to the damper of the active damping system. The transmission characteristic acquiring device 11 drives the actuators 131, acquires vibration state signals detected by the sensors 130 upon the driving of the actuators 131, thereby calculates the transmission characteristics, and outputs the calculated transmission characteristics to the damper configuration calculating device 10.

The vibration detector 110 of the transmission characteristic acquiring device 11 is connected to the plurality of sensors 130 and acquires the vibration state signals detected by the sensors 130.

The driving controller 111 of the transmission characteristic acquiring device 11 is connected to the plurality of actuators 131, outputs driving command signals to the actuators 131 on the basis of input information of a method for driving the actuators 131, and drives the actuators 131.

The transmission characteristic calculator 112 of the transmission characteristic acquiring device 11 calculates the transmission characteristics from the driving signals for driving the actuators 131 and the vibration state signals detected by the sensors 130 upon the driving of the actuators 131.

Lastly, operations of the input device 12 and the display device 13 are described.

The input device 12 sets the damping performance required of the active damping system in the damping performance setting unit 101 of the damper configuration calculating device 10.

The display device 13 presents results calculated by the damper configuration calculator 102 of the damper configuration calculating device 10.

In the present embodiment, the damper configuration calculating device 10 and the transmission characteristic acquiring device 11 are unified in the measuring device, but the damper configuration calculating device 10 and the transmission characteristic acquiring device 11 may be separated from each other.

In addition, in the present embodiment, the input device 12 and the display device 13 are separated from each other but may be unified.

FIG. 2 is a flowchart of a method for setting the active damping system using the measuring device according to the present embodiment.

First, a user of the active damping system temporarily arranges arbitrary number of sensors 130 and actuators 131 of the damper at arbitrary locations other than positions that are located on the object 20 to be subjected to the damping and at which the sensors 130 and actuators 131 cannot be physically attached (hereinafter referred to as temporary arrangement) (in S200).

Next, the user of the active damping system connects the damper to the measuring device and performs experimental vibration analysis by an operation of the measuring device (in S201).

The experimental vibration analysis is for example executed by using the measuring device to drive a single actuator 131, acquire vibration state signals detected by all the sensors 130 upon the driving of the actuator 131, and cause the transmission characteristic calculator 112 of the measuring device to calculate transmission characteristics from a driving signal for driving the actuator 131 and the vibration state signals detected by all the sensors 130.

In addition, the experimental vibration analysis is executed by calculating transmission characteristics in the same manner as described above for the other actuators 131 arranged on the object 20 to be subjected to the damping.

The transmission characteristics calculated by the experimental vibration analysis are stored in the transmission characteristic storage unit 100 of the measuring device.

Next, the user of the active damping system uses the input device 12 of the measuring device to set the damping performance in the damping performance setting unit 101 (in S202).

After the damping performance is set in the process of S202, the damper configuration calculator 102 of the measuring device specifies sensors 130 and actuators 131 of the damper that are necessary to satisfy the damping performance among the temporarily arranged sensors 130 and actuators 131, calculates an increment in the number of sensors 130 and actuators 131 necessary to satisfy the damping performance or calculates a decrement in the number of sensors 130 and actuators 131 excessive to satisfy the damping performance, and outputs and presents results of the calculation to the display device 13 (in S203).

If the arrangement of the damper needs to be changed (Yes in S204) as a result of the process of S203, the user of the active damping system additionally arranges or removes some sensors 130 and some actuators 131 on or from the object 20 to be subjected to the damping on the basis of the results presented in the process of S203 (in S205) and causes the setting method to return to the process of S203.

If the arrangement of the damper does not need to be changed (No in S204) as a result of the process of S203, the configuration of the arranged damper is determined as an arrangement configuration (hereinafter referred to as regular arrangement) upon application to the active damping system (in S206), and the user of the active damping system connects the damper regularly arranged on the object 20 to be subjected to the damping to the active damping system and starts the damping (in S207).

FIG. 3 is a Bode diagram illustrating the damping performance set in the damping performance setting unit 101 of the measuring device according to the present embodiment and describing details set in the process of S202 illustrated in FIG. 2.

A vibration characteristic 300 represents a single characteristic of vibration of the object to be subjected to the damping among a plurality of characteristics of the object 20 to be subjected to the damping.

First, a peak vibration frequency 310 that is a frequency targeted for the damping by the active damping system among an entire frequency band of the vibration characteristic 300, and peak vibration amplitude 311 that is amplitude of the vibration characteristic 300 at the peak vibration frequency 310, are set in the damping performance setting unit 101.

In addition, target amplitude 312 of the peak vibration amplitude 311, after a vibration reduction, required of the active damping system, a damping amount 313 that is the amount of the reduction in the peak vibration amplitude 311, and necessary amplitude 315 that is necessary to satisfy the damping amount 313 set in the damping performance setting unit 101 for vibration (hereinafter referred to as damping vibration) generated by an actuator 131 arranged on the object 20 to be subjected to the damping, are set in the damping performance setting unit 101.

The active damping system executes feedback control using at least one sensor 130 and at least one actuator 131 so as to generate damping vibration having a phase opposite to the vibration characteristic 300 at the peak vibration frequency 310 and the same amplitude as the damping amount 313 and thereby can achieve damping satisfying the damping amount 313.

It is, therefore, necessary that the necessary amplitude 315 be set to be equal to or larger than the damping amount 313.

In the active damping system, however, the amplitude of the damping vibration at the peak vibration frequency 310 upon the actual execution of the damping may be lower than amplitude upon the acquisition of a transmission characteristic in order to secure the stability of the feedback control in the entire frequency band.

In this case, in order for the active damping system to achieve the damping satisfying the damping amount 313, the difference between the amplitude of the damping vibration at the peak vibration frequency 310 upon the actual execution of the damping and the amplitude upon the acquisition of the transmission characteristic is set as a minimum value in the damping performance setting unit 101 according to the present embodiment, an amplitude margin 314 for correcting the difference is set in the damping performance setting unit 101, and a value obtained by summing the damping amount 313 and the amplitude margin 314 is set as the necessary amplitude 315 in the damping performance setting unit 101.

Lastly, an amplitude limit 316, which is a threshold for the amplitude of the damping vibration and is provided to limit the use of actuators 131 having amplitude of damping vibration of frequencies other than the peak vibration frequency 310, is set in the damping performance setting unit 101 in order to avoid causing the vibration characteristic 300 at frequencies other than the peak vibration frequency 310 to deteriorate by a certain level or more due to an effect of the damping vibration.

If a sensor 130 that acquires the vibration characteristic 300 is different from a sensor 130 that detects the damping vibration generated by the actuator 131, the damping performance needs to be corrected on the basis of the difference between magnification of amplitude acquired by the sensors 130.

The present embodiment assumes that the sensor 130 that acquires the vibration characteristic 300 is the same as the sensor 130 that detects the damping vibration generated by the actuator 131.

Next, details of the calculation by the damper configuration calculator 102 are described with reference to FIGS. 4, 5A to 5C, and 6A to 6C.

FIG. 4 is a flowchart of a process operation of calculating a configuration of the damper for the measuring device according to the present embodiment and describes details of the calculation by the damper configuration calculator 102 in the process of S203 illustrated in FIG. 2.

First, the damper configuration calculator 102 selects, from among the transmission characteristics stored in the transmission characteristic storage unit 100, a single transmission characteristic that is not used for the calculation by the damper configuration calculator 102 (in S400).

Next, if the transmission characteristic selected in S401 has peak vibration amplitude or damping amplitude at the peak vibration frequency 310 that is significantly larger than amplitude of vibration at other frequencies, and the transmission characteristic selected in S401 does not have peak vibration amplitude exceeding the amplitude limit 316 in a frequency band other than the peak vibration frequency 310 (Yes in S401), the damper configuration calculator 102 causes the process operation to proceed to a process of S402.

If the transmission characteristic selected in S401 does not have the peak vibration amplitude at the peak vibration frequency 310, or if the transmission characteristic selected in S401 has the peak vibration amplitude at the peak vibration frequency 310 and peak vibration amplitude exceeding the amplitude limit 316 at any of frequencies other than the peak vibration frequency 310 (No in S401), the damper configuration calculator 102 causes the process operation to proceed to a process of S405.

Details of the process of S401 are described with reference to Bode diagrams of FIGS. 5A to 5C.

Figure 5A:
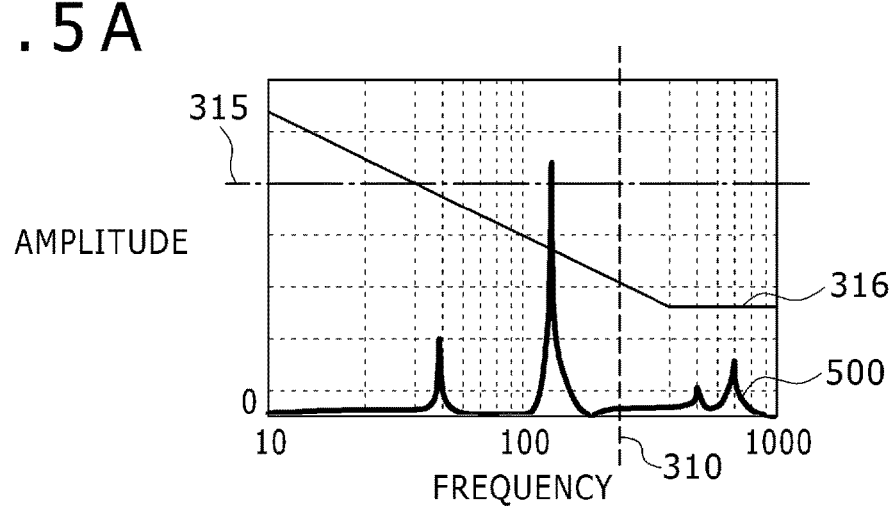
FIGS. 5A to 5C are Bode diagrams illustrating examples of transmission characteristics acquired by the measuring device according to the first embodiment.
Figure 5B:
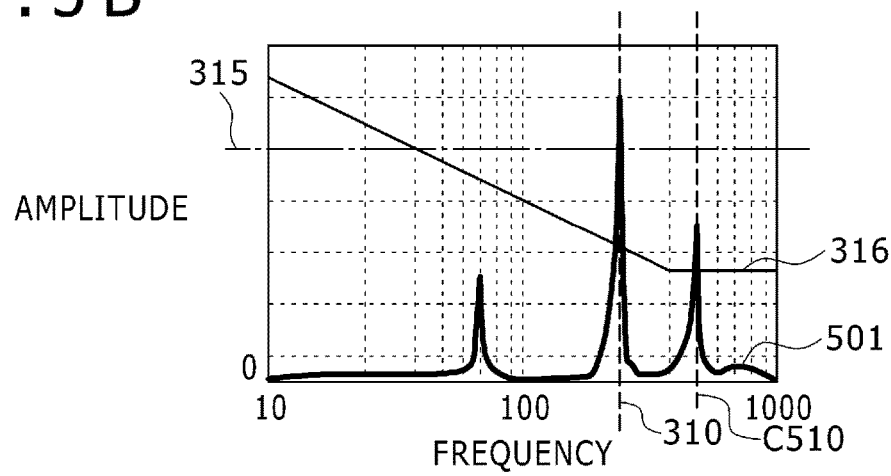
Figure 5C:
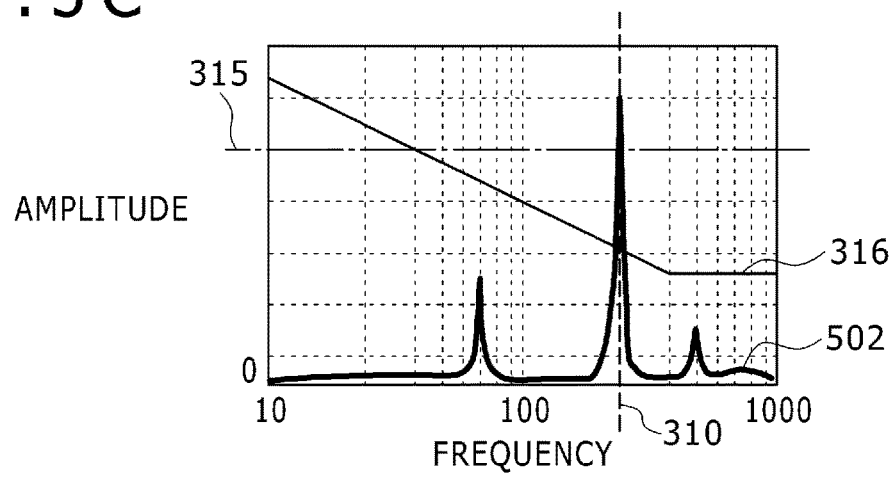

FIGS. 5A to 5C are the Bode diagrams illustrating examples of transmission characteristics acquired by the measuring device according to the present embodiment. A first transmission characteristic 500, a second transmission characteristic 501, and a third transmission characteristic 502 are transmission characteristics that are among the transmission characteristics stored in the transmission characteristic storage unit 100 and are to be selected by the damper configuration calculator 102.

The first transmission characteristic 500 illustrated in FIG. 5A does not have peak vibration amplitude at the peak vibration frequency 310. In this case, the damper configuration calculator 102 determines that the answer to the process of S401 illustrated in FIG. 4 is No.

The second transmission characteristic 501 illustrated in FIG. 5B has peak vibration amplitude at the peak vibration frequency 310 but has peak vibration amplitude (corresponding to peak vibration amplitude at a frequency C510 illustrated in FIG. 5B) exceeding the amplitude limit 316 at a frequency other than the peak vibration frequency 310. In this case, the damper configuration calculator 102 determines that the answer to the process of S401 illustrated in FIG. 4 is No.

The third transmission characteristic 502 illustrated in FIG. 5C has peak vibration amplitude at the peak vibration frequency 310 and does not have peak vibration amplitude exceeding the amplitude limit 316 at frequencies other than the peak vibration frequency 310. In this case, the damper configuration calculator 102 determines that the answer to the process of S401 illustrated in FIG. 4 is Yes.

Returning to the flowchart illustrated in FIG. 4, the process operation is described from the process of S402.

If the peak vibration amplitude at the peak vibration frequency 310 in the transmission characteristic selected in S401 exceeds the necessary amplitude 315 in the process of S402 (Yes in S402), the damper configuration calculator 102 classifies the transmission characteristic selected in S401 and a pair of the sensor 130 and actuator 131 used for the acquisition of the selected transmission characteristic into a single arrangement group (in S403) and causes the process operation to proceed to the process of S405.

If the peak vibration amplitude at the peak vibration frequency 310 in the transmission characteristic selected in S401 does not exceed the necessary amplitude 315 (No in S402), the damper configuration calculator 102 classifies the transmission characteristic selected in S401 and the pair of the sensor 130 and actuator 131 used for the acquisition of the selected transmission characteristic into a plural arrangement group (in S404) and causes the process operation to proceed to the process of S405.

The third transmission characteristic 502 corresponds to the affirmative answer "Yes" to the determination of the process of S402.

If all the transmission characteristics stored in the transmission characteristic storage unit 100 are selected in the process of S401 (Yes in S405), the process operation proceeds to a process of S406.

If at least one transmission characteristic among the transmission characteristics stored in the transmission characteristic storage unit 100 is not selected in the process of S401 (No in S405), the process operation returns to the process of S400.

If a transmission characteristic classified into the single arrangement group in the process of S403 and a pair of a sensor 130 and actuator 131 used for the acquisition of the transmission characteristic exist (Yes in S406), the damper configuration calculator 102 selects a single transmission characteristic having the largest amplitude at the peak vibration frequency 310 among transmission characteristics classified into the single arrangement group and a pair of a sensor 130 and actuator 131 used for the acquisition of the single transmission characteristic (in S407) and causes the process operation to proceed to a process of S408.

If a transmission characteristic classified into the single arrangement group in the process of S403 and a pair of a sensor 130 and actuator 131 used for the acquisition of the transmission characteristic do not exist (No in S406), the process operation proceeds to a process of S409.

If at least one transmission characteristic classified into the plural arrangement group in the process of S404 and at least one pair of a sensor 130 and actuator 131 used for the acquisition of the transmission characteristic exist (Yes in S409), the process operation proceeds to a process of S410.

If a transmission characteristic classified into the plural arrangement group in the process of S404 and a pair of a sensor 130 and actuator 131 used for the acquisition of the transmission characteristic do not exist (No in S409), there is a possibility that all sensors 130 arranged on the object 20 to be subjected to the damping may be located at positions at which the sensors 130 hardly detect vibration generated by all actuators 131 arranged on the object 20 to be subjected to the damping or that all the actuators 131 may be arranged on the object 20 at a mode at which all the actuators 131 hardly generate vibration at the peak vibration frequency 310. Therefore, display device 13 presents the fact that a sensor 130 and an actuator 131 need to be additionally arranged at positions at which the damper is not arranged on the object 20 to be subjected to the damping (in S413), and the process operation is terminated.

If the total of amplitude at the peak vibration frequency 310 in all transmission characteristics classified into the plural arrangement group in the process of S404 exceeds the necessary amplitude 315 (Yes in S410), the damper configuration calculator 102 selects the minimum number of transmission characteristics necessary to cause the total of the amplitude at the peak vibration frequency 310 to exceed the necessary amplitude 315 and all pairs of sensors 130 and actuators 131 used for the acquisition of the transmission characteristics (in S411) by a method for selecting the transmission characteristics from among all the transmission characteristics classified into the plural arrangement group in order from a transmission characteristic in which amplitude at the peak vibration frequency 310 is largest and completing the selection when the total of amplitude at the peak vibration frequency 310 in all the transmission characteristics classified into the plural arrangement group in the process of S404 becomes equal to or larger than the necessary amplitude 315 or by another method. Then, the process operation proceeds to a process of S408.

If the total of the amplitude at the peak vibration frequency 310 in all the transmission characteristics classified into the plural arrangement group in the process of S404 does not exceed the necessary amplitude 315 (No in S410), the damping amplitude of the actuators 131 arranged on the object 20 to be subjected to the damping is small, and thus the display device 13 is caused to present the fact that an actuator 131 needs to be additionally arranged at a position at which the damper is not arranged on the object 20 to be subjected to the damping and that at least one of the actuators 131 used for the acquisition of the transmission characteristics classified into the plural arrangement group needs to be replaced with an actuator 131 with large excitation force (in S412), and the process operation is terminated.

In the process of S412, the excitation force that is necessary for the actuator 131 with which the at least one actuator 131 is to be replaced may be presented on the basis of the difference between the necessary amplitude 315 and the total of the amplitude at the peak vibration frequency 310 in all the transmission characteristics classified into the plural arrangement group, or the type of the actuator 131 determined on the basis of the necessary excitation force may be presented.

Details of the process of S410 are described below with reference to Bode diagrams of FIGS. 6A to 6C.

Figure 6A:
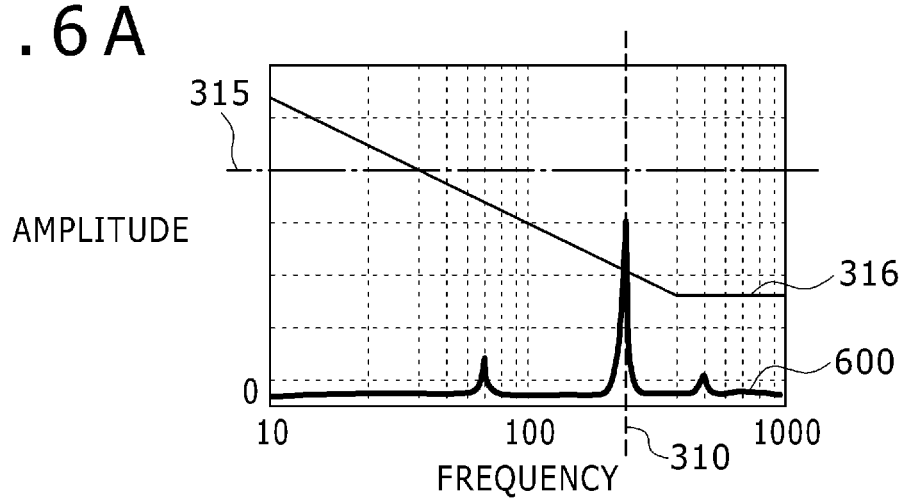
FIGS. 6A to 6C are Bode diagrams illustrating examples of transmission characteristics classified into a plural arrangement group by the measuring device according to the first embodiment.
Figure 6B:
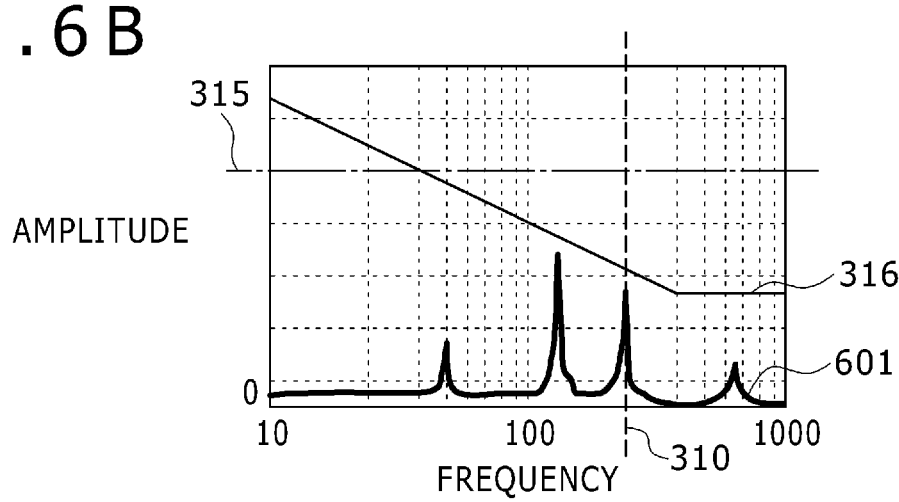
Figure 6C:
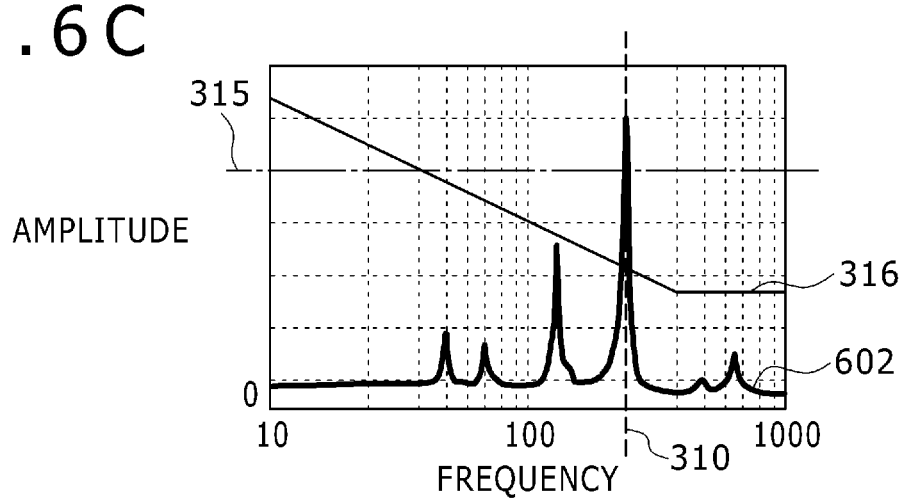

FIGS. 6A to 6C are the Bode diagrams illustrating examples of the transmission characteristics classified into the plural arrangement group by the measuring device according to the present embodiment.

A fourth transmission characteristic 600 illustrated in FIG. 6A and a fifth transmission characteristic 601 illustrated in FIG. 6B both have peak vibration amplitude at the peak vibration frequency 310, while the peak vibration amplitude does not exceed the necessary amplitude 315.

Thus, the fourth and fifth transmission characteristics 600 and 601 are classified into the plural arrangement group in the process of S404 illustrated in FIG. 4.

If no transmission characteristic is classified into the single arrangement group, and transmission characteristics classified into the plural arrangement group are the two fourth and fifth transmission characteristics 600 and 601, the total of the amplitude at the peak vibration frequency 310 in the fourth and fifth transmission characteristics 600 and 601 is calculated in the process of S410 illustrated in FIG. 4.

A synthesized transmission characteristic 602 illustrated in FIG. 6C is formed by summing amplitude of the fourth and fifth transmission characteristics 600 and 601 in the entire frequency band, and it is apparent, from the synthesized transmission characteristic 602, that the total of the amplitude at the peak vibration frequency 310 in the fourth and fifth transmission characteristics 600 and 601 is equal to or larger than the necessary amplitude 315.

In this case, the damper configuration calculator 102 determines that the answer to the process of S410 illustrated in FIG. 4 is Yes, and the fourth transmission characteristic 600, a pair of a sensor 130 and actuator 131 used for the acquisition of the fourth transmission characteristic 600, the fifth transmission characteristic 601, and a pair of a sensor 130 and actuator 131 used for the acquisition of the fifth transmission characteristic 601 are selected in the process of S411 illustrated in FIG. 4.

Returning to the flowchart of FIG. 4, the process operation is described from the process of S408.

The display device 13 is caused to present a pair of a sensor 130 and actuator 131 selected in the process of S407 or the process of S411 (in S408), and the process operation is terminated.

In the present embodiment, the single transmission characteristic that has the largest amplitude at the peak vibration frequency 310 among the transmission characteristics classified into the single arrangement group, and the pair of the sensor 130 and actuator 131 used for the acquisition of the single transmission characteristic, are selected in the process of S407. Alternatively, the determination method of the process of S407 may be changed depending on a purpose so as to select a single transmission characteristic and a pair of a sensor 130 and an actuator 131 with the smallest or largest excitation force or the smallest or largest excitation energy, or select a single transmission characteristic and a pair of a sensor 130 and an actuator 131 that are most easily arranged or maintained, or the like.

In the present embodiment, the minimum number of sensors 130 and actuators 131 that achieve amplitude exceeding the necessary amplitude 315 are selected in the process of S411. However, the minimum number of sensors 130 and actuators 131 that achieve the smallest excitation force of the actuators 131 or the smallest excitation energy of the actuators 131, or the minimum number of sensors 130 and actuators 131 that are most easily arranged or maintained, may be selected in the process of S411.

Figure 7:
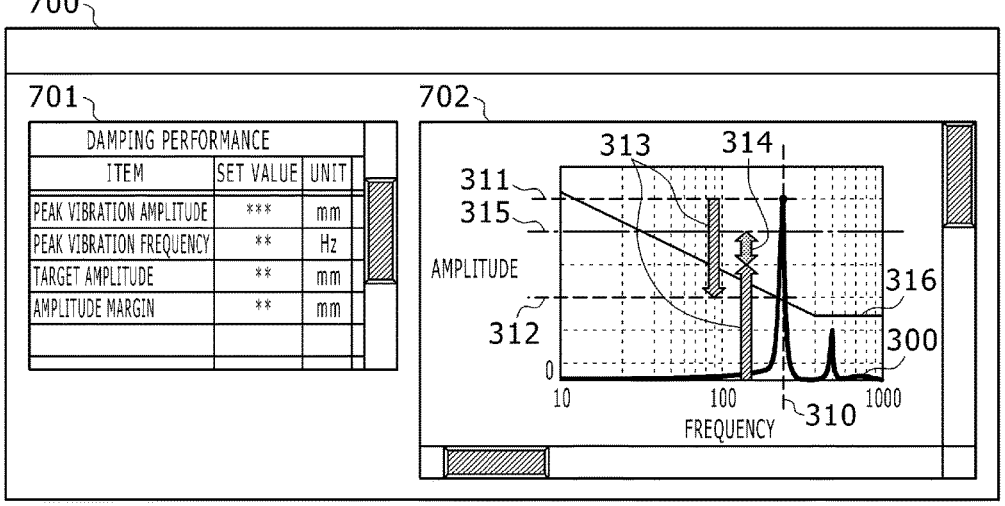
FIG. 7 is a diagram illustrating a setting screen of an input device according to the first embodiment.

FIG. 7 is a diagram illustrating a setting screen 700 of the input device 12 according to the present embodiment. Details of a method for setting the damping performance in the damping performance setting unit 101 of the measuring device are described with reference to FIG. 7.

The setting screen 700 has a damping performance input part 701 and a damping performance display part 702.

The damping performance that is the peak vibration frequency 310, the peak vibration amplitude 311, the target amplitude 312, the amplitude margin 314, and the like and is set in the damping performance setting unit 101 is input in the damping performance input part 701.

The damping performance display part 702 displays the vibration characteristic 300 measured by the measuring device or set in the input device 12 and further displays the damping performance set in the damping performance input part 701, the damping amount 313 calculated from the damping performance, and the necessary amplitude 315.

When the setting of the damping performance input part 701 is completed, the input device 12 sets information of all the damping performance in the damping performance setting unit 101.

Figure 8:
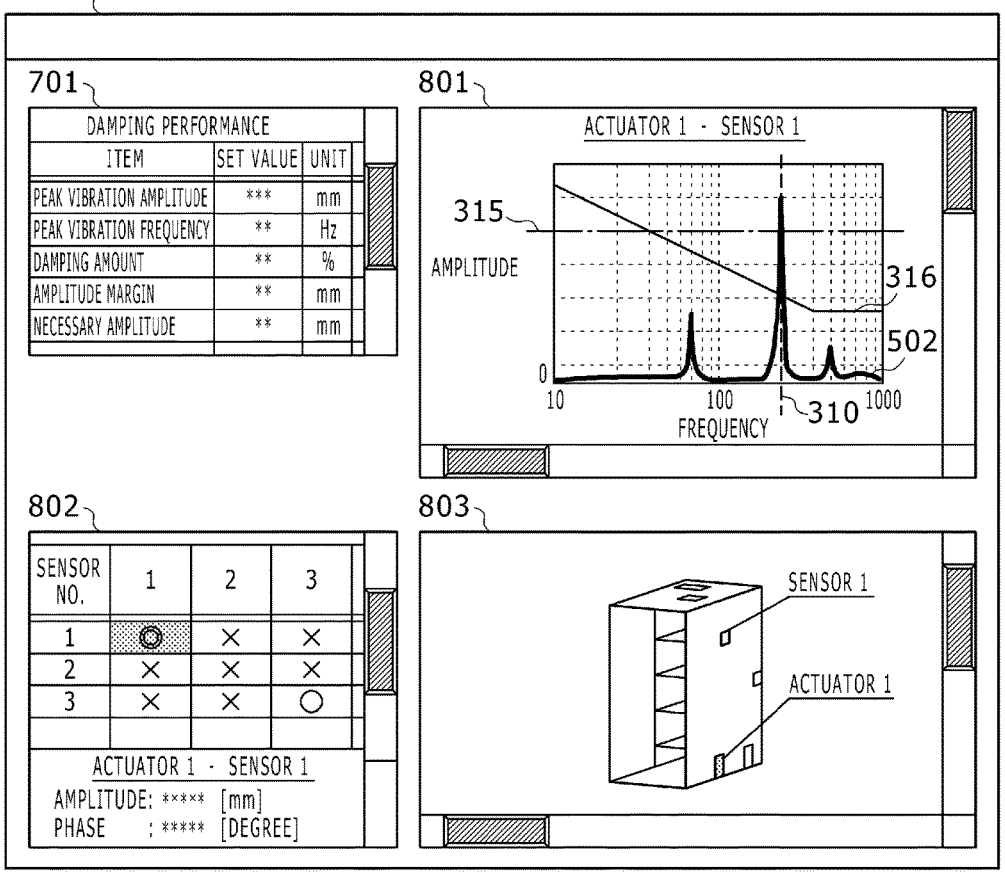
FIG. 8 is a diagram illustrating a display screen of a display device according to the first embodiment.

FIG. 8 is a diagram illustrating a display screen 800 of the display device 13 according to the present embodiment. Details of a method for presenting results of the damper configuration calculator 102 of the measuring device are described with reference to FIG. 8.

The display screen 800 has the damping performance input part 701, a damping vibration display part 801, a calculation result display part 802, and a damper selection result display part 803.

The damping vibration display part 801 displays a transmission characteristic selected in the calculation by the damper configuration calculator 102.

In the present embodiment, the transmission characteristic acquired by a single pair of a sensor 130 and an actuator 131 is displayed. If multiple pairs of sensors 130 and actuators 131 are selected in the calculation by the damper configuration calculator 102, a transmission characteristic formed by summing transmission characteristics acquired by the selected sensors 130 and the selected actuators 131 may be displayed.

The calculation result display part 802 presents a pair of a sensor 130 and actuator 131 selected in the calculation by the damper configuration calculator 102 and the need of addition and changes of sensors 130 and actuators 131 of the damper.

In order for an operator to easily recognize a pair of a sensor 130 and actuator 131 selected in the calculation by the damper configuration calculator 102, the damper selection result display part 803 visually displays an image of the object 20 to be subjected to the damping or a connection diagram of the sensor 130, the actuator 131, and the measuring device.

In the present embodiment, the process method is applied to the active damping system, the active damping system including the damper having the plurality of sensors 130 and the plurality of actuators 131, the damper being arranged on the object to be subjected to the damping. The process method includes the step of calculating, on the basis of the transmission characteristics calculated from the driving signals for driving the actuators 131 and the vibration state signals detected by the sensors 130 upon the driving of the actuators 131 and the damping performance required of the active damping system, how many the number of the sensors 130 and actuators 131 is increased or decreased, with the increase or decrease in the number of the sensors 130 and the actuators 131 being necessary in order that the damping performance of the active damping system is satisfied.

In addition, the process method may include the step of calculating, from the sensors 130 and actuators 131 of the damper, a pair of a sensor 130 and an actuator 131 that are at least necessary to satisfy the damping performance on the basis of the plurality of transmission characteristics and the damping performance.

In the present embodiment, in the process method, the damping performance may include the amplitude margin 314 set to a value equal to or larger than the difference between the amplitude of vibration generated upon the damping actually executed using a sensor 130 and an actuator 131 by the active damping system and the amplitude upon the acquisition of a transmission characteristic, and the amplitude limit 316 that is the amplitude threshold for limiting the amplitude of vibration other than the frequency targeted for the damping when the damping is actually executed by the active damping system using the sensor 130 and the actuator 131.

In addition, the process method may include the steps of acquiring the vibration state signals detected by the plurality of sensors 130, outputting the driving command signals for driving the plurality of actuators 131, and calculating the transmission characteristics from the driving signals for driving the actuators 131 and the vibration state signals detected by the sensors 130 upon the driving of the actuators 131.

In addition, the process method may include the step of setting the damping performance required of the active damping system from the input device 12 of the measuring device and causing the display device 13 of the measuring device to present results calculated by the damper configuration calculator 102.

In addition, the process method may include the steps of controlling a display unit on the basis of results calculated by the damper configuration calculator 102 and controlling the display unit attached to the damper of the active damping system so as to present results calculated on the basis of the plurality of transmission characteristics and the damping performance.

In addition, the process method may include the steps of controlling a display unit on the basis of results calculated by the damper configuration calculator 102 and controlling the display unit attached to the measuring device so as to present the results calculated on the basis of the transmission characteristics and the damping performance.

According to the present embodiment, since the object 20 to be subjected to the damping is experimentally vibrated using a plurality of actuators 131 arranged on the object 20 to be subjected to the damping, and the number of necessary sensors 130 and actuators 131 and how many the number of the sensors 130 and actuators 131 is increased or decreased can be automatically calculated using characteristics acquired by a plurality of sensors 130, a mechanism characteristic of the object 20 to be subjected to the damping and a mechanism model do not need to be prepared and the number of processes to be applied by the active damping system to the object 20 to be subjected to the damping can be reduced. Thus, a problem especially with vibration in a post-process for a product can be quickly handled and a high damping effect can be achieved.

Second Embodiment

Figure 9:
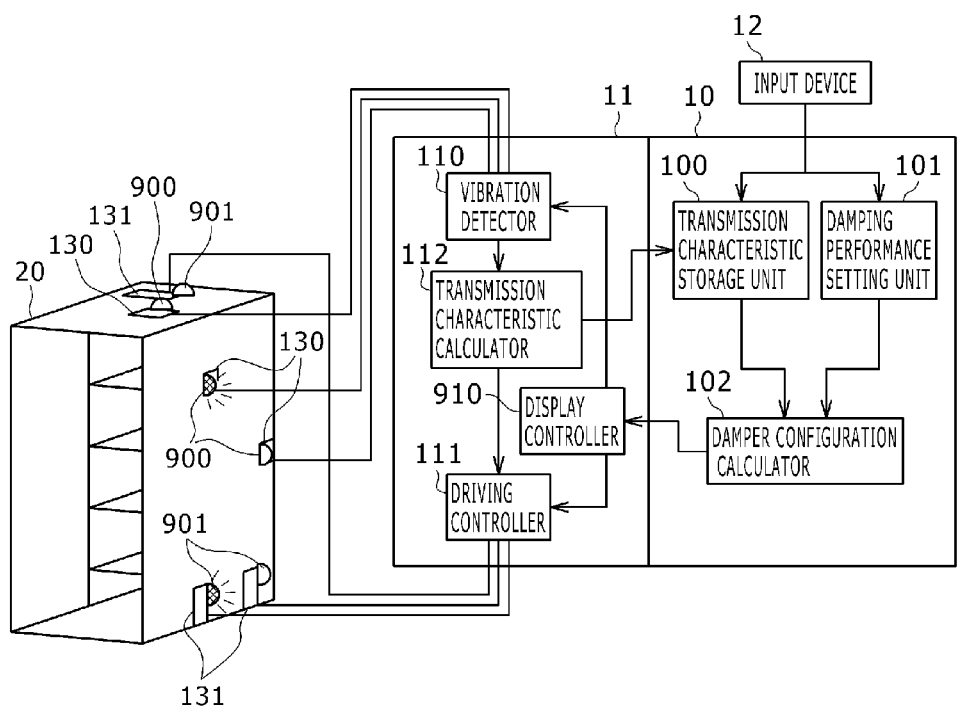
FIG. 9 is a diagram illustrating a measuring device according to a second embodiment.

FIG. 9 is a diagram illustrating the measuring device according to a second embodiment.

In the second embodiment, the sensors 130 that are arranged on the object 20 to be subjected to the damping have sensor display units 900 for displaying results of the calculation by the damper configuration calculator 102 of the measuring device, while the actuators 131 that are arranged on the object 20 to be subjected to the damping have actuator display units 901 for displaying results of the calculation by the damper configuration calculator 102 of the measuring device.

In addition, the transmission characteristic acquiring device 11 further includes a display controller 910 for controlling a display method of the sensor display unit 900 and a display method of the actuator display unit 901 on the basis of results of the calculation by the damper configuration calculator 102.

In the present embodiment, since pairs of sensors 130 and actuators 131 that are selected by the damper configuration calculator 102 are presented by sensor display units 900 and actuator display units 901 that are attached directly to the actual damper, a change in the arrangement of the damper and the occurrence of an error made by the operator upon the regular arrangement can be reduced.

Other effects obtained by the measuring device according to the second embodiment are the same as or similar to the first embodiment, and a duplicate description thereof is omitted.

What is claimed is:

1. A measuring device applied to an active damping system, the active damping system including a damper having sensors and actuators, the damper being arranged on an object to be subjected to damping, the measuring device comprising:
   a transmission characteristic storage unit configured to store a plurality of transmission characteristics calculated from driving signals that drive the actuators and vibration state signals detected by the sensors upon the driving of the actuators;
   a damping performance setting unit configured to set damping performance including an amount of vibration reduction that is required of the active damping system and a frequency of vibration; and
   a damper configuration calculator configured to calculate how many of the sensors and actuators for the damper are increased or decreased on the basis of the plurality of transmission characteristics stored in the transmission characteristic storage unit and the damping performance set in the damping performance setting unit, with the increase or decrease in number of the sensors and actuators being necessary in order to satisfy the damping performance set in the damping performance setting unit.

2. The measuring device according to claim 1, wherein the damper configuration calculator calculates, from the sensors of the damper and the actuators of the damper, a pair of a sensor and an actuator that are at least necessary to satisfy the damping performance set in the damping performance setting unit, on the basis of the plurality of transmission characteristics stored in the transmission characteristic storage unit and the damping performance set in the damping performance setting unit.

3. The measuring device according to claim 1, wherein the damping performance setting unit has, as the set damping performance, an amplitude margin set to a value equal to or larger than differences between amplitude when the damping is actually executed using the sensors and the actuators by the active damping system and amplitude upon an acquisition of the transmission characteristics, and an amplitude limit that is an amplitude threshold that limits amplitude of vibration other than a frequency targeted for the damping when the damping is actually executed using the sensors and the actuators by the active damping system.

4. The measuring device according to claim 1, further comprising:

a vibration detector connected to the sensors and configured to acquire the vibration state signals detected by the sensors;

a controller connected to the actuators and configured to output driving command signals to the actuators and drive the actuators on the basis of input information of a method for driving the actuators; and a transmission characteristic calculator configured to calculate the transmission characteristics from the driving signals for driving the actuators and the vibration state signals detected by the sensors upon the driving of the actuators, wherein the transmission characteristic calculator causes the calculated transmission characteristics to be stored in the transmission characteristic storage unit.

5. The measuring device according to claim 1, further comprising:

an input device configured to set the damping performance required of the active damping system in the damping performance setting unit; and a display device configured to present results calculated by the damper configuration calculator.

6. The measuring device according to claim 5, wherein the input device and the display device are unified.

7. The measuring device according to claim 1, further comprising a display controller configured to control a display unit on the basis of results calculated by the damper configuration calculator, wherein the display controller controls the display unit attached to the damper of the active damping system and thereby presents the results calculated by the damper configuration calculator.

8. The measuring device according to claim 1, further comprising a display controller configured to control a display unit on the basis of results calculated by the damper configuration calculator, wherein the display controller controls the display unit attached to the measuring device and thereby presents the results calculated by the damper configuration calculator.

* * * * *